United States Patent Office 2,894,326
Patented July 14, 1959

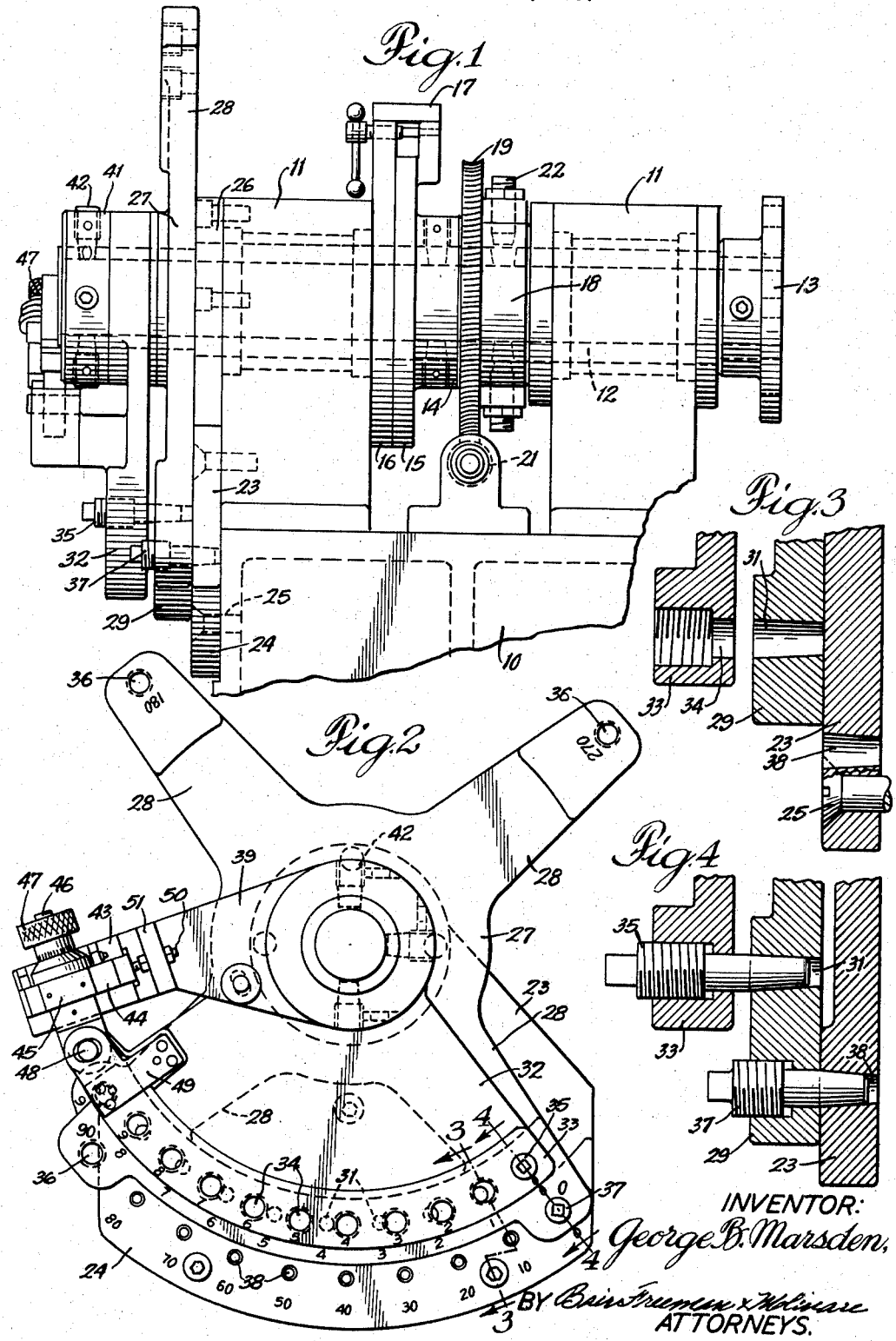

2,894,326
PROTRACTOR
George B. Marsden, Cicero, Ill.

Application February 25, 1957, Serial No. 642,092

6 Claims. (Cl. 33—1)

This invention relates to protractors, and more particularly to a protractor for use with a radial machine such as a radial mill, radial boring machine or the like.

Protractors of various types have been used in a variety of different measuring and machining operations for many years. One example of a highly efficient protractor is that disclosed and claimed in my Patent No. 2,594,574.

One difficulty with protractors as heretofore known is that their accuracy depends entirely upon the accuracy of manufacture, and once completed there is no way to adjust or calibrate them. As a result, accuracy is limited in most cases to minutes and seconds can be measured only by extremely expensive protractors.

One of the objects of the present invention is to provide a protractor which can easily be adjusted or calibrated after completion so that an extremely high degree of accuracy can be obtained in use without requiring a similar degree of accuracy in manufacture.

Another object is to provide a protractor in which fine adjustments are made by a micrometer screw acting between relatively movable levers, and the screw is adjustably mounted for radial movement on one of the levers to calibrate the protractor.

Still another object is to provide a protractor combined with a radial machine in which the final adjustable element of the protractor is connected directly to the headstock shaft of the machine to effect extremely accurate angular adjustment thereof.

The above and other objects and features of the invention will be more readily apparent from the following description when read in connection with the accompanying drawing in which:

Figure 1 is a partial side elevation of a radial machine equipped with a protractor embodying the invention;

Figure 2 is a front elevation of the protractor; and

Figures 3 and 4 are partial sections on the lines 3—3 and 4—4 respectively of Figure 2.

The machine as partially illustrated in Figure 1 comprises a base 10 on which a pair of pillow blocks 11 are supported rotatably mounting a tubular headstock shaft 12 carrying a headstock 13 whose angular position is to be accurately adjusted. The shaft 12 extends through the pillow blocks and projects beyond the end of the frame for attachment to the protractor as described hereinafter.

The shaft may be locked in any selected angular position by a hub 14 secured thereto and carrying a flange 15 lying in face to face registry with a fixed flange 16 on one of the pillow blocks. The flange 16 carries a clamp 17 which can be tightened to engage the flange 15 to hold the shaft in selected position, or which can be loosened to permit angular adjustment of the shaft.

For operations in which the shaft is to be turned continously, as for example in a facing or grooving operation, the shaft may be turned through a collar 18 carrying a worm gear 19 meshing with a driving worm 21. The collar 18 carries screws 22 which can be threaded into registering openings in the shaft 12 to connect the collar and worm gear to the shaft or which can be backed out to the position shown to free the collar and worm gear from the shaft for normal operations.

The protractor of the present invention comprises a frame 23 having an arcuate edge portion 24 extending through an arc of at least 80°. The frame 23 is secured to the frame of the machine by screws 25 with the arcuate edge portion 24 concentric with the axis of the shaft 12. Preferably, the frame includes a hub portion 26 fitting around the shaft to ensure concentricity.

Three lever members are rotatably mounted concentric with the axis of the shaft 12 and are preferably rotatably supported on the shaft 12 by bearing portions at their ends. The first of the lever members as shown at 27 has a central hub portion to fit around the shaft 12 and four arms 28 projecting from the hub portion at 90° intervals. Two of the arms are connected by an arcuate segment 29 formed with at least nine uniformly spaced openings therein as shown at 31.

The second arm as shown at 32 has an arcuate edge portion 33 extending through an arc of approximately 90° and formed with a series of uniformly spaced openings 34 therethrough to register with the openings 31 in the edge portion 29 of the first lever member 27. The openings 34 are adapted to receive threaded pins 35 which can be threaded into the openings 31 to lock the first and second lever members together in any one of a plurality of angular positions. Similarly, the first lever member is formed at the end of each of its four arms with an opening 36 to receive threaded pins 37 to fit into uniformly spaced openings 38 in the arcuate edge portion of the frame 23.

The third lever member comprises a simple lever 39 having a hub 41 fitting on the shaft 12 and formed with radially extending openings therein to receive locking pins 42 which can be threaded or otherwise forced into openings in the shaft 12 to connect the third lever member to the shaft. At its outer end the third lever member carries a plate 43 formed with a radially extending dovetail groove slidably to receive a supporting plate 44 for a micrometer screw mechanism.

The micrometer screw mechanism comprises a nut 45 secured to the supporting plate 44 and a threaded rod 46 extending through the nut and adapted to be turned by a knurled handle 47. The screw 46 terminates in a flat end portion carrying a pin 48 which extends through radially elongated slots in a yoke element 49 secured to the second lever member 32. The pin 48 has a tight fit circumferentially in the slots in the yoke element to eliminate free motion circumferentially, but can slide radially for adjustment.

The supporting plate is connected to an adjusting screw 50 carrying nuts lying on opposite sides of a projecting flange 51 on the lever 39 so that the radial position of the micrometer unit can be accurately adjusted and fixed. During radial adjustment of the mounting plate and micrometer unit, the pin 48 will slide radially in the slots in the yoke 49 to maintain tight connection between these elements and between the second and third lever members.

The openings 38 in the frame 23 are preferably spaced 10° apart and are accurately located. By inserting the locking pin 47 in the selected one of the openings 36 and by registering the selected opening 36 with the correct one of the openings 38 in the frame, an angular adjustment accurate to 10° can be obtained. The openings 31 and 34 are spaced to provide a vernier adjustment of 1°. Thus the nine openings 34 are spaced uniformly more closely together than the nine openings 31 so that by bringing the selected ones of the openings into registry and inserting a locking pin 35 therein, the second plate 32 can be angularly adjusted relative to the first plate 28 within 1°. For finer adjustments in minutes and seconds the micrometer screw 46 is turned to turn the lever 39 relative to the lever member 32 and the micrometer screw can be so designed as to produce extremely fine adjustments on the order of seconds or fractions of a second.

By adjusting the radial position of the micrometer unit on the lever 39, the fine adjustment can be accurately calibrated and errors in manufacture can be compensated for. To calibrate the instrument the levers 32 and 28 are set to any selected position with the micrometer screw turned to the limit of its adjustment in either direction and with the indicator on the micrometer screw set either to zero or to 1°. The lever member 32 may now be disconnected from the lever member 38, and the micrometer screw may be turned to the limit of its adjustment in the opposite direction. If the instrument is properly calibrated, the lever member 32 will have been moved relative to the lever member 28 through exactly 1°, and the openings 31 and 34 corresponding to the 1° movement will be in exact registry. If this is not the case, the supporting plate 44 may be adjusted in the appropriate direction to produce the precise 1° movement, and the instrument is then properly calibrated.

When the instrument is attached to a radial machine as shown in Figure 1, with the frame 23 secured to the frame of the machine and the lever 39 secured to the headstock shaft, it will be seen that adjustment of the protractor will accurately position the headstock shaft to any desired angle. Once the protractor is correctly mounted on the machine and correctly calibrated as described above, it may be used easily and rapidly to provide extremely accurate angular adjustments.

While one embodiment of the invention has been shown and described in detail, it will be understood that this is illustrative only and is not to be taken as a definition of the scope of the invention, reference being had for this purpose to the appended claims.

What is claimed is:

1. A protractor comprising a frame, three lever members pivotally connected to the frame on a common axis, means to connect a first of the lever members to the frame in any one of a plurality of different angular positions, means to connect the first of the lever members to a second of the lever members in any one of a plurality of relative angular positions, said angular positions defining different angular intervals, means including a micrometer type screw connecting the second of the lever members to the third of the lever members to provide a fine adjustment of the angle therebetween, means mounting the micrometer type screw on one of the second or third lever members for radial movement thereon, a radially slidable connection between the micrometer type screw and the other of the second or third members, and adjusting means to move the micrometer type screw radially on the member on which it is mounted.

2. A protractor comprising a frame, three lever members pivotally connected to the frame on a common axis, means to connect a first of the lever members to the frame in any one of a plurality of different angular positions, means to connect the first of the lever members to a second of the lever members in any one of a plurality of relative angular positions, said angular positions defining different angular intervals, a micrometer including a nut and a screw threaded through the nut, means mounting the nut on one of the second or third lever members for radial movement thereon, a radially slidable connection between the screw and the other of the second or third members, and adjusting means to move the nut radially on the member on which it is mounted.

3. A protractor comprising a flat frame having an arcuate edge portion extending through at least 80°, first, second and third flat lever members pivoted on the frame on a common axis concentric with the arcuate edge portion, means to secure the first lever member to the arcuate edge portion in any one of a plurality of angular positions corresponding to relatively large angular intervals, means to secure the second lever member to the first lever member in any one of a plurality of angular positions corresponding to smaller angular intervals, a micrometer unit including a nut and a screw threaded into the nut, means mounting the nut on the third lever member for radial sliding movement, a radially slidable connection between the screw and the second lever member, and adjusting means to move the nut radially on the third lever member.

4. The construction of claim 3 in which the first lever member includes four radially extending arms spaced 90° from each other and the first securing means selectively connects the arms to spaced points along the arcuate edge portion of the frame.

5. In a protractor, a pair of lever members pivotally connected together on a common axis, means to secure one of the lever members in any one of a plurality of angular positions about said axis, means including a micrometer type screw connecting the lever members to provide a fine adjustment of the angle therebetween, means mounting the micrometer type screw on one of the lever members for radial movement thereon, a radially slidable connection between the micrometer type screw and the other of the lever members, and adjusting means to move the micrometer type screw radially on the lever member on which it is mounted.

6. In combination with a machine tool having a frame and a rotatable headstock shaft on the frame adjustable to different angular positions of an arcuate segment secured to the frame coaxial with the shaft, first, second and third lever members rotatable on a common axis coaxial with the shaft, means to secure the first lever member to the segment in any one of a plurality of relative angular positions, means to secure the second lever member to the first lever member in any one of a plurality of angular positions, said angular positions defining different angular intervals, a micrometer unit connecting the second and third lever members including a nut mounted on one of said members for radial movement and a screw threaded into the nut and having a radially slidable connection with the other of said members, adjusting means to move the nut radially on the member on which it is mounted, and means to connect the third lever to the shaft.

References Cited in the file of this patent

UNITED STATES PATENTS

| | | |
|---|---|---|
| 2,357,329 | Hansen | Sept. 5, 1944 |
| 2,406,043 | Sorensen | Aug. 20, 1946 |
| 2,443,364 | Vancura | June 15, 1948 |
| 2,588,932 | Klingenberg | Mar. 11, 1952 |
| 2,594,574 | Marsden | Apr. 29, 1952 |